United States Patent [19]
Goldstein et al.

[11] 4,381,963
[45] May 3, 1983

[54] MICRO FABRICATION MOLDING PROCESS

[75] Inventors: Irving S. Goldstein, Teaneck, N.J.; Franklin D. Kalk, Rochester, N.Y.; Harry W. Deckman, Fanwood, N.J.

[73] Assignee: The University of Rochester, Rochester, N.Y.

[21] Appl. No.: 173,533

[22] Filed: Jul. 30, 1980

[51] Int. Cl.³ .............................................. B29C 1/14
[52] U.S. Cl. ................................... 156/245; 29/463; 156/304.1; 156/304.2; 264/219; 264/220; 264/221; 264/225; 264/227
[58] Field of Search ................ 156/58, 59, 242, 245, 156/304.1, 304.2; 29/463; 264/219, 220, 221, 225, 227

[56] References Cited

U.S. PATENT DOCUMENTS

| | | | |
|---|---|---|---|
| 2,388,776 | 11/1945 | Wallace | 264/225 |
| 2,464,738 | 3/1949 | White et al. | 264/81 |
| 3,816,572 | 6/1974 | Roelofs | 264/237 |
| 4,034,032 | 7/1977 | Hendricks | 264/219 |
| 4,133,854 | 1/1979 | Hendricks | 264/42 |

FOREIGN PATENT DOCUMENTS 1062528  3/1967  United Kingdom ............... 264/219

*Primary Examiner*—Caleb Weston

*Attorney, Agent, or Firm*—Martin Lukacher

[57] ABSTRACT

Identical half-section shells of microscopic size, such as hemispherical shells from which spherical laser fusion targets can be made are capable of mass production by micro fabrication molding techniques. A body (preferably a hollow glass microsphere which is called a glass microballoon) provides a pattern for the hemispherical shells, and is used to produce an original mold section. One or more master molds are formed from this original mold section by replication. Many identical replica molds are made by casting soluble material onto the master mold and removing them therefrom. The replica molds are coated with one or more layers which will form the hemispherical shell wall. The material coating the flat background around the hemispherical cavity is referred to as the flange and is removed to form free standing shells. In order to remove the flange material, the coated replica molds are overcoated with a soluble material which is etched away to the level of the flange. The remaining soluble material acts as a mask for the shell material when the flange material is etched away. The replica mold and overcoating body remain as a protective mask and are dissolved away to release the identical shell sections. These sections can be assembled to provide closed shells. Overlapping lips can be formed during flange removal so as to facilitate the assembly of the sections into the closed shells.

18 Claims, 18 Drawing Figures

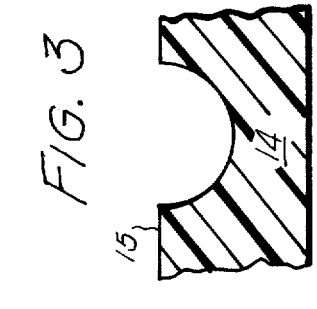
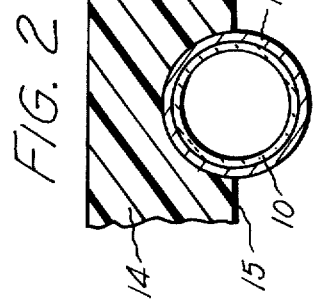
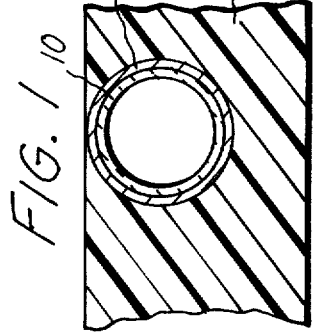
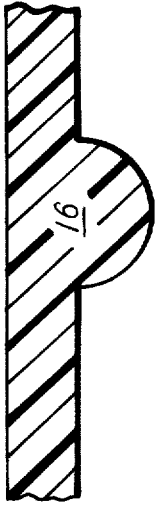
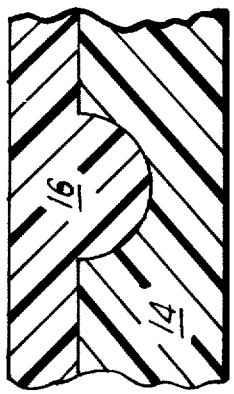
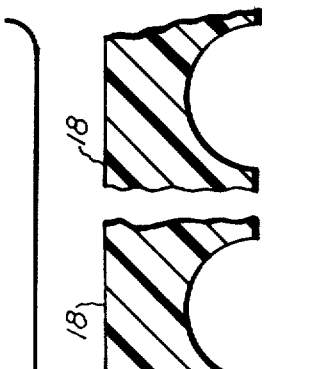
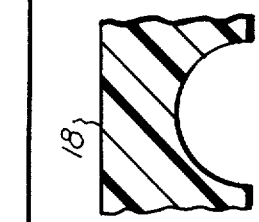
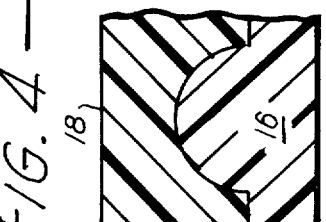
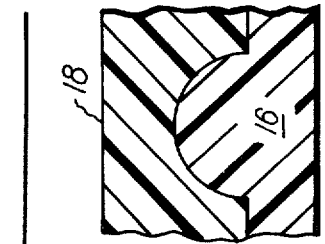
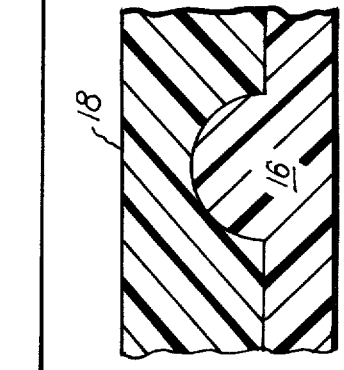

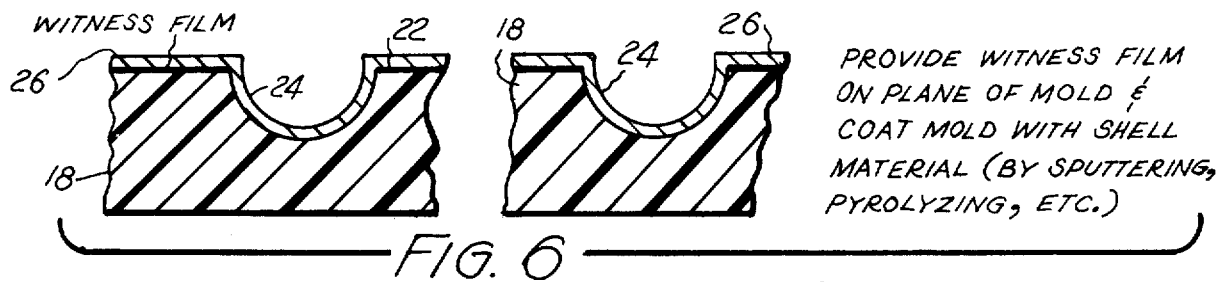

FIG. 6 — Provide witness film on plane of mold & coat mold with shell material (by sputtering, pyrolyzing, etc.)

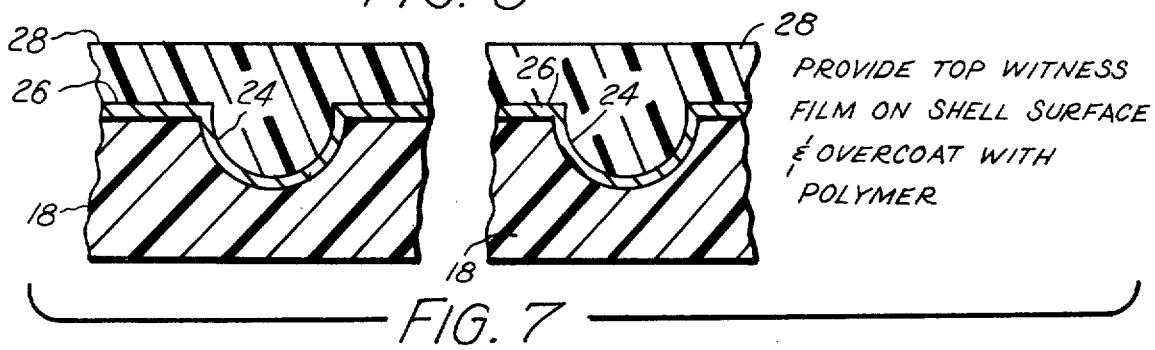

FIG. 7 — Provide top witness film on shell surface & overcoat with polymer

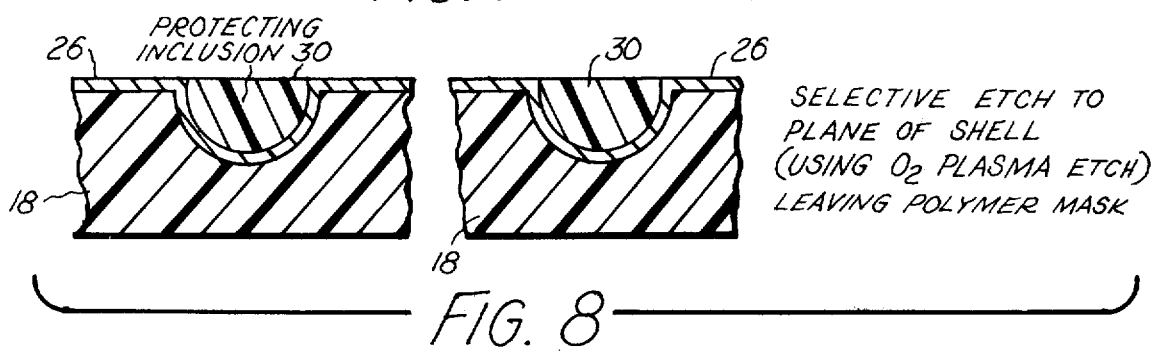

FIG. 8 — Selective etch to plane of shell (using $O_2$ plasma etch) leaving polymer mask

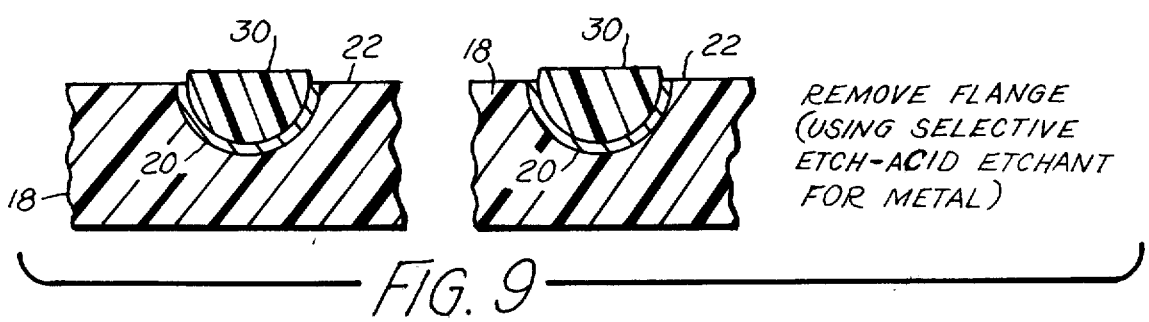

FIG. 9 — Remove flange (using selective etch-acid etchant for metal)

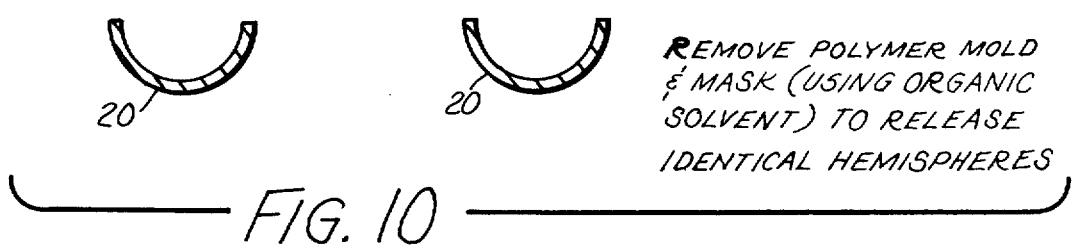

FIG. 10 — Remove polymer mold & mask (using organic solvent) to release identical hemispheres

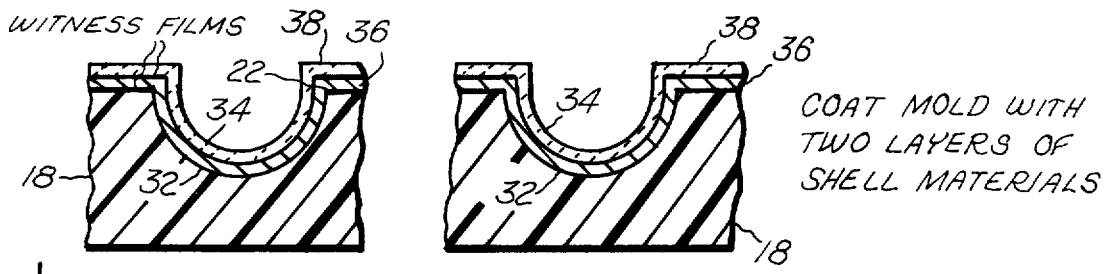

FIG. 11 — COAT MOLD WITH TWO LAYERS OF SHELL MATERIALS

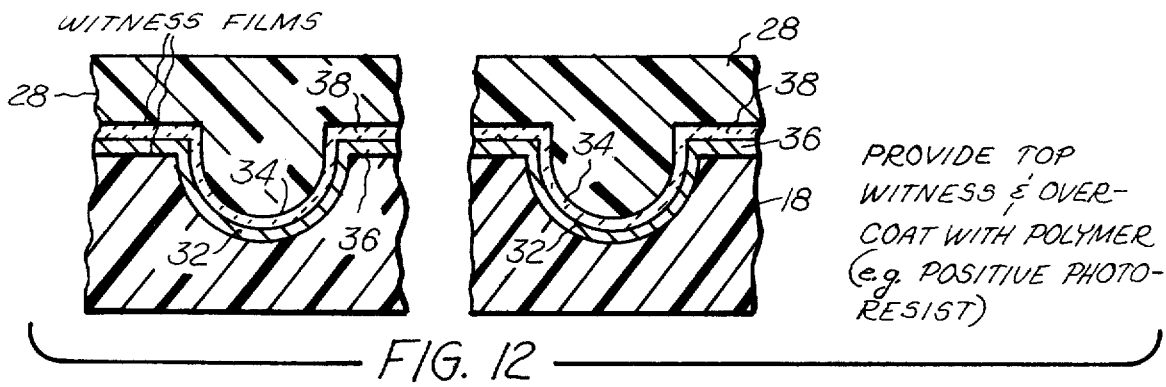

FIG. 12 — PROVIDE TOP WITNESS & OVERCOAT WITH POLYMER (e.g. POSITIVE PHOTORESIST)

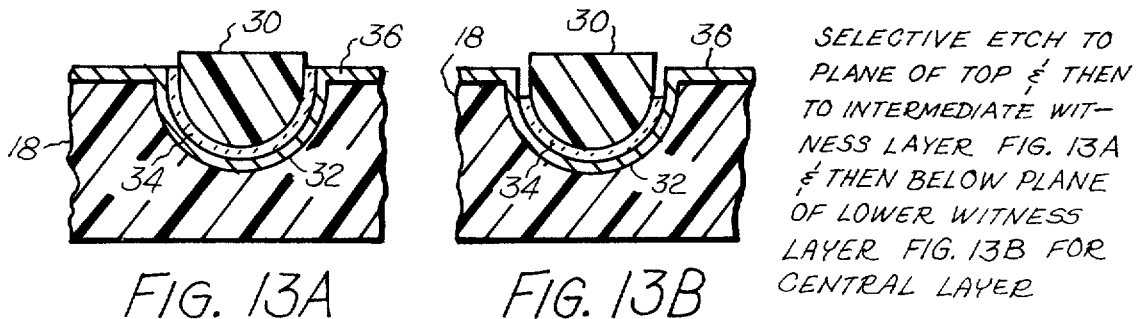

FIG. 13A   FIG. 13B — SELECTIVE ETCH TO PLANE OF TOP & THEN TO INTERMEDIATE WITNESS LAYER FIG. 13A & THEN BELOW PLANE OF LOWER WITNESS LAYER FIG. 13B FOR CENTRAL LAYER

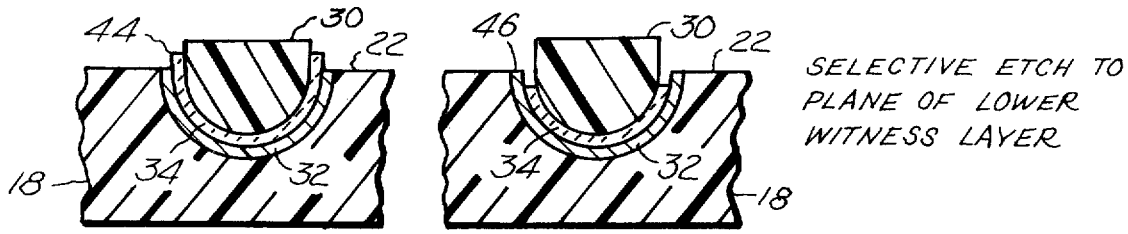

FIG. 14A   FIG. 14B — SELECTIVE ETCH TO PLANE OF LOWER WITNESS LAYER

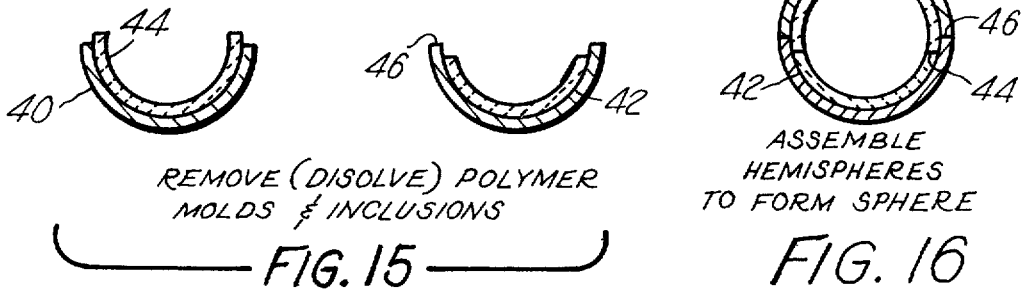

FIG. 15 — REMOVE (DISSOLVE) POLYMER MOLDS & INCLUSIONS

FIG. 16 — ASSEMBLE HEMISPHERES TO FORM SPHERE

MICRO FABRICATION MOLDING PROCESS

The present invention relates to molding processes and particularly to a process of micro fabrication molding which enables the production of conjugate sections adapted to be assembled into closed shells.

The invention is especially suitable for use in the manufacture of inertial confinement fusion targets. Such targets contain material which undergoes fusion reactions when a high energy beam such as a laser beam is incident thereon. The micro-fabrication molding process provided by the invention is also applicable wherever the precision molding of small, three dimensional objects is desired.

The need for inertial confinement fusion targets which are identical in size and shape and may be structured shells of layers of different materials, for example, glass, plastics and metals, has resulted in different proposals for the micro-fabrication of hemispherical shells. The straight forward extension of micro-machining, molding or intergrated circuit production techniques (see the Lawrence Livermore Laboratory Annual Report for 1977, UCRL-50021-77; B. Cranfill, E. H. Farnum, A. T. Lowe and J. R. Miller, *Proc. Topical Meeting on Inertial Confinement Fusion*, Feb. 7-9, 1978, San Diego, Calif.; and W. J. Hillegas, *Proc. Topical Meeting on Inertial Confinement Fusion*, Feb. 26-28, 1980, San Diego, Calif.) has not proved feasible to meet the needs, such as size uniformity, surface finish and replication reliability with reasonable cost.

The problems of providing shells from which fusion targets may be constructed and an approach using integrated circuits technology is discussed in Wise, et al., *J. Vac. Sci. Technol.*, 16 (3), 936 (1979) and United Kingdom Patent Application No. GB 2025683A, published Jan. 23, 1980, which states that it corresponds to U.S. application Ser. No. 925,437, filed July 17, 1978. Molding techniques of the type which have been suggested in the past are simply inadequate for the production of the shells which are identical conjugates and have the accuracy, surface finish and consistency of replication desired. Accordingly such molding techniques as have been suggested for making essentially two-dimensional objects such as diffraction gratings (see White, et al. U.S. Pat. No. 2,464,738) or freezing silicates from a slurry (see Roelofs, U.S. Pat. No. 3,816,572) are inadequate. Techniques for encapsulating laser fusion targets, particularly microballoons, are also inadequate for the production of the targets themselves. Also the microballoons are not each identical to another which further increases the lack of identity among the fabricated targets (see Hendricks, U.S. Pat. No. 4,034,032). For further information respecting the production of glass microballoons and other fusion targets, reference may also be had to Hendricks, U.S. Pat. No. 4,133,854.

It is an object of the invention to provide an improved process for micro-fabrication molding which is particularly adapted to the molding of shell sections which may be assembled into closed shells suitable for use in the fabrication of laser fusion targets, ranging from about 20 to 1000 microns (micrometers) in size.

It is a further object of the present invention to provide an improved molding process capable of producing a large number of conjugate shells which may be mated together to form closed shells.

It is a still further object of the present invention to provide an improved molding process which produces shells of very smooth surface finish and can reproduce the surface finish of a glass surface such as that of a glass microballoon.

It is a still further object of the present invention to provide an improved micro-fabrication molding process which replicates with high accuracy.

It is a still further object of the present invention to provide an improved micro-fabrication molding process which provides shells of diameter, wall thickness and structure, as from a plurality of layers, which can be readily selected.

It is a still further object of the present invention to provide an improved micro-fabrication molding process which is suitable for mass production of identical shells and may be also used for the mass production of fusion targets.

Briefly described, a process for fabricating conjugate shells in accordance with the invention may use a body as a pattern for hemisections from which the shells may be assembled. Preferably the body is a glass microballoon and provides the replicated shell with a smooth surface finish of the glass microballoon which is used as a pattern. An original mold section is made from the body. Preferably this is accomplished by embedding the body in an embedding medium, such as a particulate-free epoxy and removing the hardened epoxy to a plane which defines conjugate sections of the body. In the case of a sphere this is a plane through the equator of the body. The original mold section is used to cast one or more master molds. Then replica molds of soluble material are made from the master mold. A multiplicity of such replica molds can be made. The molds are then coated by at least one layer of the material which is to form the shell. The layered material around the cavity is referred to as the flange and is removed in the processing. Such removal is carried out while protecting the shells by providing an overcoating protective body which may be of the same soluble material as the replica molds. The protective body and the flanges are etched away to the surface of the replica mold, thereby accurately removing the flange. The shells are removed by dissolving the replica mold and the protective body. These identical shells may be made of a plurality of layers. In the flange removal step, lips of the layers which overlap when the shells are assembled may be formed.

The foregoing and other objects, features and advantages of the invention as well as the best mode now known for practicing the invention will become more apparent from a reading of the following description in connection with the accompanying drawings in which FIGS. 1 through 16 are diagrammatic sectional views each illustrating a different step in the micro-fabrication molding process provided in accordance with the present invention.

In practicing the invention a spherical body, namely a hollow glass microballoon (HMG) 10 is selected having the diameter desired for the molded replicas which are to be fabricated. HMG's are preferably used as patterns to create the hemispherical mold section used as the original mold section from which master patterns and replica molds are formed. HGM's were used because they can be selected to have a high degree of spherical accuracy, and an excellent smoothness of surface finish which is reproduced on the shells that are molded. The HGM 10 is selected from HGM's that are made by conventional HGM manufacturing processes, such as described in the above-referenced Hendricks patent. Any solid microsphere of comparable quality may also be used. In order to facilitate the removal of the microballoon in making the original mold section, a release agent may be placed on the microballoon. Such a release agent is suitably a very thin film (500 angstroms or less thickness) of copper which may be sputtered on the microballoon. This film 12 is shown exaggerated in thickness in FIGS. 1 and 2.

The HGM 10 may suitably have a diameter of from 20 to 1000 microns and a wall thickness of at least a few microns so as to provide the wall strength and maintain sphericity with contraction of the embedding material 14. This embedding material may suitably be an epoxy having essentially no particulates. A low viscosity epoxy such as No. 5135 Spurr epoxy, which is obtainable from the Ernest F. Fullan, Inc. Company of Schenectady, N.Y., is suitable. This epoxy is described in the *Journal of Ultra-Structure Research,* 26, 3 (1969).

The microballoon may be dropped into the liquid epoxy as from a hair. The balloon falls into the epoxy as if it would be pulled down, possibly by surface tension forces. The epoxy is caused to hardened as by curing it in an oven, at about 60° C. for about 24 hours.

By removal of the epoxy to a plane through the equator of the microballoon about which conjugate sections of the microballoon exist, the original mold section is formed. Still with the HGM 10 therein, this first mold is in the form shown in FIG. 2. The removal of the epoxy is preferably accomplished by etching with a selective plasma etch. Oxygen may be used as the etchant gas. The oxygen plasma etches the organic material, namely the epoxy, without significantly attacking the glass of the HMG. In other words, active species in the plasma are chemically reactive with the organic material (the epoxy) and not reactive with the glass. This type of selective etching is used repeatedly in accordance with the invention, as will be noted as the description proceeds. The plasma etcher may be a chamber containing two parallel plates between which a radio frequency field is established. The dynamically pumped chamber is maintained at a pressure of approximately 0.01 Torr by flowing oxygen into the chamber. The plasma is then created. The epoxy body can be mounted on one of the plates and is etched by the plasma. Preferably the epoxy body is mounted on the plate to which the radio frequency voltage is applied (i.e., the cathode).

Etching is carried on for a predetermined period of time which is required to remove the epoxy to the plane of the conjugate sections of the pattern; that is to the level of the equator of the sphere. To verify the accuracy of the etch, the partially embedded microsphere in the epoxy 14 may be removed from the etcher and the height of the microballoon over the plane of the surface 15 is measured, as with a microscope or other accurate measuring device for measuring surface height. A stylus type measuring device may be used.

The original mold section, as shown in FIG. 3 is obtained by removal of the microsphere 10. This provides a hemispherical cavity with the shape of the original pattern. The epoxy body with the microsphere embedded, as shown in FIG. 2, may be placed in an ultrasonic bath. The ultrasonic agitation causes the microsphere to fall off the body 14. The original mold section, as shown in FIG. 3, is used to fabricate one or more master molds 16, as shown in FIG. 4. In the event that convex rather than concave replica molds 18, as shown in FIG. 5, are desired, the original mold section may consist of the epoxy body with the hemispherical section of the microballoon 10 exposed above the surface 15, as shown in FIG. 2. The use of a concave or negative mold section both for the first mold and for the replica mold is desirable, since it facilitates the removal of flanges from the shell, as will be described in connection with FIGS. 6 to 9.

To make the master mold patterns, of which one or preferably several are made, the original mold section, as shown in FIG. 3, is replicated using silicone rubber or some other material which is phobic to the material of the original mold section 14. The Silicone rubber used may be either the type RTV-E or Sylgard 170, both of which are manufactured by the Dow-Corning Company of Midland, Mich. The silicone rubber is an organometallic compound, particularly dimethylsiloxane. A thick layer of silicone rubber in liquid form is placed over the first mold section and caused to harden, as by curing for about 24 hours at room temperature. The silicone rubber master molds 16 are made one at a time and peeled off the epoxy original mold section.

The master mold 16 is replicated in many identical replica molds 18. A polymer material is preferred for use in making the replica molds. The polymer of the replica molds 18 and the silicone rubber master mold 16 are phobic with respect to each other and are easy to remove without damaging the replica mold 18 in any way. For example, a positive photoresist can be used as the replica mold material. A drop of the positive photoresist, such as photoresist 111S, positive photoresist manufactured by the Shipley Co. of Newton, Mass., is placed over the master mold or molds 16 and allowed to harden as by curing in an oven at about 60° C. for 6 to 8 hours. This evaporates the solvent in the photoresist and allows the resist to harden. An important characteristic of the polymer 18 is that it is soluble in an organic solvent, such as an acetone based solvent. This enables the final shell 20, as shown in FIG. 9, to be removed by dissolving the replica molds 18.

The shells are made by coating the replica molds 18 on the surface 22 thereof, which has the hemispherical cavity therein, with a layer of the material 24 which is desired for the shells 20. The materials may be of any type desired for the purpose. For laser fusion targets, the materials may be metals (such as gold) glass, or plastics. A particularly suitable plastic for laser fusion targets is known as Parylene. Parylene is a trademark of the Union Carbide Corporation and is in the class of p-xylyene or paracyclophane. Parylene polymers are described for example in the following U.S. Pat. Nos.: 3,288,728; 3,342,754; 3,472,795; 3,503,903; and 3,472,795. A useful characteristic of some Parylenes is that they are not dissolved by acetone based solvents, but can be plasma etched like most organic materials.

The layer 24 is formed on the surface 22, preferably after the surface is coated with a witness film, say of copper. This film may be very thin, for example less than 500 Angstroms. The thickness of the layer 24 is selected in accordance with the design of the target. It may be several microns thick. Sputtering techniques may be used for depositing metallic and glass films. Pyrolyzing techniques may be used for the deposition of Parylene films. Other deposition and coating techniques, for example electroplating after the deposition of electroless material may be used. The layer 24 coats the cavity in the replica molds 18. If the deposition technique used for layer 24 is directional, the layer 24 may be made uniform in thickness by inclining and rotating the replica molds 18 with respect to the depositing flux during deposition. A flange 26 surrounds the layer 24 in the cavity. The removal of this flange 26 enables the hemispherical shells 20 to be produced.

Removal of the flange 26 without destroying the spherical accuracy of the shell 24, involves the sequence of steps shown in FIG. 7 through 9.

A covering body 28 of polymer material is deposited over the shell layer 24 and fills the cavity therein. Prior to deposition of the covering body 28, another witness layer may be deposited over the shell layer, in the event that the shell layer needs to be clearly distinguishable from the material constituting the covering body 28. A polymer, preferably the same positive photoresist, is used to provide the covering body 28. To facilitate the ultimate removal of the shell 20 upon the dissolution of the replica mold 18, the material of the covering body should dissolve in the same solvent as the replica mold 18.

After allowing the covering body to harden, it is placed in the plasma etcher and etched to the upper surface of the flange 26. An oxygen plasma etch may be used. This leaves a protecting inclusion 30 in the cavity, as shown in FIG. 8. The inclusion 30 serves as a protective mask for the layer 24 in the cavity. The flange 26 is now removed to provide the structure shown in FIG. 9. In the event that the layer material is metal, an acid etchant or an argon sputter etch can be used. For glass a florinated gas may be used in the plasma etcher. In the case of Paralyene or other plastic materials, the oxygen plasma etch may be used. Etching continues until the surface 22 of the replica mold is reached. The witness film on the surface 22 shows when this occurs. Now the flange 26 is entirely removed and the accuracy of the hemispherical shell is maintained since the surface 22 is exactly at the equator of the shell 20.

Identical shells 20 are removed from the mold by dissolving the inclusion 30 and the replica mold 18 so as to release the identical hemispheres 20. The hemispheres are shown as one layer thick. It should be appreciated that they may be structured from a plurality of layers depending upon the target design which is needed. In order to provide spheres, any two identical shells are aligned. Electrostatic attraction holds the shells together or a thin polymer membrane may be used. The edges of the shells adhere to the membrane. An overcoating of polymer or metal may be used and prevents any possible disassembly of the shells. Other target bodies may be located within the shells by the use of membranes or fibers as discussed in the above-referenced Wise, et al. article and British patent application.

Overlapping or dovetailed hemispherical shells which facilitate the assembly thereof into spherical shells may be made in accordance with the process, as illustrated in FIGS. 11 through 14. The replica molds are made in the same way as described in connection with FIGS. 1 through 5. A plurality of shell layers are applied to the surface 22 of the replica mold having the cavity therein. To illustrate the invention, consider for example that an outer layer 32 of metal, such as gold and an inner layer 34 of glass, both of approximately the same thickness are deposited as by sputtering on the surface 22. Witness films may be deposited on the surface 22 and on the top of the inner glass layer 34. The witness film on the top surface of the metal layer 32 is not used since the color of the metal makes this surface quite visible. An intermediate wetness film would be desirable if this was not the case. A covering body 28 is deposited over the inner film 34 and covers the flanges 36 and 38. Hemispheres 40 having an inside lip are formed by the steps shown in FIGS. 13A and 14A. Other hemispheres 42 having an outside lip are formed by the steps illustrated in FIGS. 13B and 14B. These hemispheres 40 and 42 are shown in FIG. 15 after removal from the mold.

Three successive selective etches are used to make the hemispheres 40 and 42. In both cases an oxygen plasma etch to the surface of the flange 38 of the inner film 34 removes the protective body 28 and leaves the protective inclusion 30 as a mask therein. Next the flange 38 is removed as by a florinated methanol plasma etch (see FIG. 13A). The etch is allowed to proceed until the surface of the flange 36 is reached. In FIG. 13B the etch proceeds for a longer period of time until a thickness of the inner layer 34 of glass shell in the cavity is removed to a depth equal to twice the thickness of the outer layer. An inner lip 44 is formed by a selective plasma etch to remove the flange 36 the lip 44 which remains at a height above the surface 22, and therefore above the edge of the inner layer of the shell 32, equal to the layer thickness. A similar acid etch is used to remove the flange 36 to the surface 22 of the replica mold 18. A lip 46 remains on the outer shell which is of a height above the inner shell 34 equal to the thickness of the shell.

The protective mask 30 and the replica mold 18 are removed by dissolving them in a solvent bath. This leaves the hemispherical shells 40 and 42 with their respective inner 44 and outer lips 46. These lips 44 and 46 overlap when the hemispheres 40 and 42 are assembled to form a sphere, as shown in FIG. 16. Identical spheres which may be used as fusion targets may therefore be provided.

From the foregoing description it will be apparent that there has been provided an improved molding process and particularly a micro-fabrication molding process which is especially suitable for producing multiplicities of shells which may be used in fabricating fusion targets. Variations and modifications in the herein described process within the scope of the invention will undoubtedly suggest themselves to those skilled in the art. Accordingly the foregoing description should be taken as illustrative and not in a limiting sense.

We claim:

1. The process for fabricating conjugate shells which comprises the steps of making a first mold from a glass microballoon which has conjugate sections about a plane therethrough as a pattern which first mold has the shape of one of said sections, casting at least one master mold in said first mold, molding a plurality of replica molds of soluble material from said master mold, coating at least one layer in each of said replica molds to form shells therein, and dissolving said replica molds to produce a plurality of identical shells, each having the shape of a conjugate section of said microballoon.

2. The process as set forth in claim 1 further comprising mating pairs of said shells with each other to produce identical shells each having the same external size and shape as said pattern body.

3. The process as set forth in claim 1 wherein said process provides hemispherical shells, and said step of making said first mold with the shape of a hemispherical section comprises the use of a said microballoon as said pattern.

4. The process as set forth in claim 1 wherein said master mold casting step comprises the step of placing a material which is removable from said first mold upon hardening therein, and removing said material when it hardens to provide said master mold.

5. The process as set forth in claim 1 wherein said step of making said first mold comprises the steps of embedding said microballoon in an embedding medium, removing said medium to said plane, said plane being a plane through the equator of said microballoon.

6. The process as set forth in claim 5 wherein said removal step comprises etching of said medium to expose said microballoon to said plane.

7. The process as set forth in claim 6 wherein said embedding medium is of organic material, and etching with an oxygen plasma etch to remove said medium to said plane.

8. The invention as set forth in claim 5 further comprising the step of removing said microballoon to provide said section therein.

9. The process as set forth in claim 5 wherein said embedding medium is epoxy substantially free of particulates.

10. The process for fabricating conjugate shells which comprises the steps of making a first mold from a body which has conjugate sections at a plane therethrough as a pattern which first mold has the shape of one of said sections, casting at least one master mold in said first mold, molding a plurality of replica molds of soluble material from said master mold, coating at least one layer in each of said replica molds to form shells therein, dissolving said replica molds to produce a plurality of identical shells each having the shape of said section, said master mold casting step comprising the steps of placing a material which is removable from said first mold upon hardening therein, and removing said material when it hardens to provide said master mold, said first mold being made by casting epoxy having an absence of particulates around said body, removing said epoxy to said plane, and removing said body to provide the cavity having the same shape as said section therein, and said master mold casting step is carried out by placing liquid silicone rubber material on said first mold filing said cavity, causing said silicone rubber material to harden into said master mold, and removing said silicone rubber master mold.

11. The process as set forth in claim 10 wherein said master mold casting steps are repeated to as to provide a plurality of master molds.

12. The process for fabricating conjugate shells which comprises the steps of making a first mold from a body which has conjugate sections about a plane therethrough as a pattern which first mold has the shape of one of such sections, casting at least one master mold in said first mold, molding a plurality of replica molds of soluble material from said master mold, coating at least one layer in each of said replica molds to form shells therein, dissolving said replica molds to produce a plurality of identical shells each having the shape of said section, removing any flanges from said layers prior to dissolving said replica molds, said flange removing step comprising the steps of placing soluble material over said layers in said replica mold, filing the cavities therein over said layers to provide covering bodies on said layers, removing said covering bodies to expose the surface of said layers leaving a protective mask included in the cavity over said layers, removing said layers to the surface of said replica molds, and dissolving said mask in the cavities over said layers.

13. The process as set forth in claim 12 wherein said covering body and layer removal steps are carried out by selective etching.

14. The process as set forth in claim 12 wherein said replica mold and said covering body are formed from polymer material soluble in the same organic solvent, and said replica mold and protective mask dissolving steps are carried out together.

15. The process as set forth in claim 14 wherein said polymer is a positive photoresist.

16. The process as set forth in claim 12 wherein said layer coating step comprises coating a plurality of layers of different material in said replica molds upon the surface thereof having said cavity therein, and said flange removing step is carried out to provide complementary lips in different ones of said shells which overlap each other when said shell sections are assembled to form a closed shell.

17. The process as set forth in claim 16 wherein said body is a glass microballoon, said sections are hemispherical, said flange removal step is carried out by etching said covering bodies to the surface of a first of said layers therein, then on the first of a pair of said replica molds with the layer and protective mask in the cavity therein etching the inner one of said plurality of layers to the surface of an outer one of said plurality of layers, selectively etching away the outer one of said layer to the surface of said replica mold leaving a lip of said inner layer about equal to the thickness of said outer layer, on the second of said replica molds selectively etching the inner one of said plurality of layers to a level below the plane of the flange of an outer one of said plurality of layers about equal to the thickness of said outer layer, and then selectively etching said outer layer to the surface of said replica mold, thereby leaving a lip of said outer layer.

18. The process as set forth in claim 17 further comprising depositing witness films on the surface of said replica mold and on the layers therein.

* * * * *